United States Patent
Cooley et al.

(10) Patent No.: US 11,561,523 B2
(45) Date of Patent: Jan. 24, 2023

(54) SUBTENDED DEVICE MAPPING THROUGH CONTROLLER INTROSPECTION

(71) Applicant: Mapped Inc., El Segundo, CA (US)

(72) Inventors: Shaun Cooley, El Segundo, CA (US); Jose De Castro, San Francisco, CA (US); Jason Koh, San Diego, CA (US)

(73) Assignee: MAPPED INC., El Segundo, CA (US)

( * ) Notice: Subject to any disclaimer, the term of this patent is extended or adjusted under 35 U.S.C. 154(b) by 0 days.

(21) Appl. No.: 17/372,275

(22) Filed: Jul. 9, 2021

(65) Prior Publication Data

US 2022/0147019 A1    May 12, 2022

Related U.S. Application Data

(60) Provisional application No. 63/112,268, filed on Nov. 11, 2020.

(51) Int. Cl.
*G06F 15/173* (2006.01)
*G05B 19/05* (2006.01)
(Continued)

(52) U.S. Cl.
CPC ........... *G05B 19/054* (2013.01); *G05B 19/05* (2013.01); *G06F 9/54* (2013.01); *G06F 16/212* (2019.01);
(Continued)

(58) Field of Classification Search
CPC ...................................................... H04L 41/12
(Continued)

(56) References Cited

U.S. PATENT DOCUMENTS

| 5,663,891 A | 9/1997 | Bamji et al. |
| 5,729,466 A | 3/1998 | Bamji |

(Continued)

FOREIGN PATENT DOCUMENTS

| WO | WO-9913418 A1 * | 3/1999 | ............ G05B 19/05 |
| WO | WO-2020089259 A1 | 5/2020 | |

(Continued)

OTHER PUBLICATIONS

Cheong. Four ways to quantify synchrony between time series data. Towards Data Science Available athttps://towardsdatascience.com/four-ways-to-quantify-synchrony-between-time-series-data-b99136c4a9c9 (May 13, 2019).

(Continued)

*Primary Examiner* — Hee Soo Kim
(74) *Attorney, Agent, or Firm* — Wilson Sonsini Goodrich & Rosati

(57) ABSTRACT

Described are platforms, systems, and methods to discover subtended devices through introspection of executive or supervisory controllers. The platforms, systems, and methods maintain a plurality of introspection directives, each introspection directive comprising a sequence of instructions specific to a communications protocol, the sequence of instructions comprising instructions to send at least one command to at least one controller associated with an automation environment in accordance with the communications protocol, instructions to receive a response to the at least one command, and instructions to parse the response; identify an appropriate introspection directive for the at least one controller; and execute the sequence of instructions with respect to the at least one controller to perform operations comprising: sending at least one command to at least one controller; receiving a response; and parsing the response.

28 Claims, 5 Drawing Sheets

(51) Int. Cl.
- *G06K 9/62* (2022.01)
- *G06N 20/00* (2019.01)
- *G06F 16/25* (2019.01)
- *G06F 16/21* (2019.01)
- *H04L 41/12* (2022.01)
- *G06F 16/901* (2019.01)
- *G06F 9/54* (2006.01)

(52) U.S. Cl.
CPC ........ *G06F 16/254* (2019.01); *G06F 16/9024* (2019.01); *G06K 9/6263* (2013.01); *G06K 9/6278* (2013.01); *G06N 20/00* (2019.01); *H04L 41/12* (2013.01); *G05B 2219/1215* (2013.01); *G05B 2219/13129* (2013.01); *G05B 2219/15012* (2013.01); *G05B 2219/163* (2013.01)

(58) Field of Classification Search
USPC .......................................................... 709/223
See application file for complete search history.

(56) References Cited

U.S. PATENT DOCUMENTS

| | | | |
|---|---|---|---|
| 7,606,890 B1* | 10/2009 | Baier | H04L 61/30 709/224 |
| 8,773,437 B1 | 7/2014 | Goldman et al. | |
| 8,819,206 B2 | 8/2014 | Bandi et al. | |
| 9,667,641 B2 | 5/2017 | Muddu et al. | |
| 10,019,536 B2 | 7/2018 | Hong et al. | |
| 10,044,630 B2 | 8/2018 | Kriegesmann et al. | |
| 10,216,706 B1 | 2/2019 | Bonk et al. | |
| 10,353,596 B2 | 7/2019 | Zhou | |
| 10,540,383 B2 | 1/2020 | Cobbett et al. | |
| 10,901,373 B2 | 1/2021 | Locke et al. | |
| 10,997,195 B1 | 5/2021 | Sekar | |
| 11,455,287 B1* | 9/2022 | Hillion | G06F 16/24524 |
| 2004/0049699 A1 | 3/2004 | Griffith et al. | |
| 2004/0210654 A1 | 10/2004 | Hrastar | |
| 2004/0260518 A1 | 12/2004 | Polz et al. | |
| 2007/0208440 A1 | 9/2007 | Bliss et al. | |
| 2009/0100407 A1 | 4/2009 | Bouillet et al. | |
| 2010/0014432 A1 | 1/2010 | Durfee et al. | |
| 2010/0257535 A1 | 10/2010 | Badovinatz et al. | |
| 2011/0004631 A1 | 1/2011 | Inokuchi et al. | |
| 2011/0087522 A1 | 4/2011 | Beaty et al. | |
| 2011/0179027 A1 | 7/2011 | Das et al. | |
| 2011/0295903 A1 | 12/2011 | Chen | |
| 2012/0084422 A1 | 4/2012 | Bandi et al. | |
| 2012/0158933 A1 | 6/2012 | Shetty et al. | |
| 2013/0124465 A1 | 5/2013 | Pingel et al. | |
| 2013/0232123 A1 | 9/2013 | Ahmed et al. | |
| 2014/0122806 A1 | 5/2014 | Lin et al. | |
| 2014/0277604 A1 | 9/2014 | Nixon et al. | |
| 2015/0074078 A1 | 3/2015 | Roche et al. | |
| 2015/0074117 A1 | 3/2015 | Gorelik et al. | |
| 2015/0095770 A1 | 4/2015 | Mani et al. | |
| 2015/0180891 A1 | 6/2015 | Seward et al. | |
| 2015/0256635 A1 | 9/2015 | Casey et al. | |
| 2015/0281105 A1 | 10/2015 | Vaderna et al. | |
| 2016/0019228 A1 | 1/2016 | Hong et al. | |
| 2016/0098037 A1 | 4/2016 | Zornio et al. | |
| 2016/0132538 A1* | 5/2016 | Bliss | G06F 16/20 707/741 |
| 2016/0342707 A1 | 11/2016 | Drobek et al. | |
| 2016/0373481 A1 | 12/2016 | Sultan et al. | |
| 2017/0085438 A1* | 3/2017 | Link | H04L 41/046 |
| 2017/0154080 A1 | 5/2017 | De et al. | |
| 2017/0168779 A1 | 6/2017 | Sevenich et al. | |
| 2017/0249434 A1 | 8/2017 | Brunner | |
| 2017/0286456 A1 | 10/2017 | Wenzel et al. | |
| 2018/0173795 A1 | 6/2018 | Cobbett et al. | |
| 2018/0219888 A1 | 8/2018 | Apostolopoulos | |
| 2018/0219919 A1 | 8/2018 | Crabtree et al. | |
| 2018/0232459 A1 | 8/2018 | Park et al. | |
| 2019/0057064 A1 | 2/2019 | Bonk et al. | |
| 2019/0108197 A1 | 4/2019 | Bonk et al. | |
| 2019/0132145 A1 | 5/2019 | O'Hora | |
| 2019/0133026 A1 | 5/2019 | Seaman et al. | |
| 2019/0158353 A1* | 5/2019 | Johnson | H04L 41/0803 |
| 2019/0187643 A1 | 6/2019 | Carpenter et al. | |
| 2019/0205148 A1 | 7/2019 | Schur et al. | |
| 2019/0220583 A1 | 7/2019 | Douglas et al. | |
| 2019/0324831 A1 | 10/2019 | Gu | |
| 2019/0384238 A1 | 12/2019 | Songkakul | |
| 2020/0004751 A1 | 1/2020 | Stennett et al. | |
| 2020/0280565 A1 | 9/2020 | Rogynskyy et al. | |
| 2020/0296137 A1 | 9/2020 | Crabtree et al. | |
| 2020/0327444 A1 | 10/2020 | Negi et al. | |
| 2020/0379992 A1 | 12/2020 | De Smet | |
| 2021/0073216 A1 | 3/2021 | Chang et al. | |
| 2021/0090694 A1 | 3/2021 | Colley et al. | |
| 2021/0133670 A1 | 5/2021 | Cella et al. | |
| 2021/0157312 A1 | 5/2021 | Cella et al. | |
| 2021/0157671 A1 | 5/2021 | Shastri et al. | |
| 2021/0273965 A1 | 9/2021 | Pi et al. | |
| 2021/0287459 A1 | 9/2021 | Cella et al. | |
| 2021/0293103 A1 | 9/2021 | Olsen et al. | |
| 2021/0333762 A1 | 10/2021 | Govindaraj et al. | |
| 2022/0156433 A1* | 5/2022 | Laane | G06F 9/455 |

FOREIGN PATENT DOCUMENTS

| | | | |
|---|---|---|---|
| WO | WO-2022059588 A1 * | 3/2022 | |
| WO | WO-2022103812 A1 | 5/2022 | |
| WO | WO-2022103813 A1 | 5/2022 | |
| WO | WO-2022103820 A1 | 5/2022 | |
| WO | WO-2022103822 A1 | 5/2022 | |
| WO | WO-2022103824 A1 | 5/2022 | |
| WO | WO-2022103829 A1 | 5/2022 | |
| WO | WO-2022103831 A1 | 5/2022 | |

OTHER PUBLICATIONS

Co-pending U.S. Appl. No. 17/372,238, inventors Cooley; Shaun et al., filed Jul. 9, 2021.

Co-pending U.S. Appl. No. 17/372,242, inventors Cooley; Shaun et al., filed Jul. 9, 2021.

Co-pending U.S. Appl. No. 17/372,247, inventors Cooley; Shaun et al., filed Jul. 9, 2021.

Co-pending U.S. Appl. No. 17/372,251, inventors Cooley; Shaun et al., filed Jul. 9, 2021.

Co-pending U.S. Appl. No. 17/372,256, inventors Cooley; Shaun et al., filed Jul. 9, 2021.

Co-pending U.S. Appl. No. 17/372,267, inventors Cooley; Shaun et al., filed Jul. 9, 2021.

Grady et al. Robust classification of salient links in complex networks. Nat Commun 3:864 (May 29, 2012).

PCT/US2021/058749 International Search Report and Written Opinion dated Dec. 22, 2021.

PCT/US2021/058756 International Search Report and Written Opinion dated Jan. 11, 2022.

PCT/US2021/058759 International Search Report and Written Opinion dated Dec. 22, 2021.

PCT/US2021/058762 International Search Report and Written Opinion dated Dec. 23, 2021.

PCT/US2021/058768 International Search Report and Written Opinion dated Jan. 24, 2022.

PCT/US2021/058771 International Search Report and Written Opinion dated Jan. 11, 2022.

U.S. Appl. No. 17/372,238 Non-Final Office Action dated Jan. 19, 2022.

U.S. Appl. No. 17/372,247 Non-Final Office Action dated Dec. 13, 2021.

U.S. Appl. No. 17/372,251 Office Action dated Nov. 5, 2021.

U.S. Appl. No. 17/372,267 Office Action dated Oct. 26, 2021.

U.S. Appl. No. 17/372,242 Office Action dated Nov. 15, 2021.

U.S. Appl. No. 17/372,256 Office Action dated Oct. 29, 2021.

(56) References Cited

OTHER PUBLICATIONS

George et al. Big data and management. Academy of management Journal 57(2):321-326 (2014). Retrieved on Jan. 8, 2022 from https://journals.aom.org/doi/abs/10.5465/amj.2014.4002?journalCode=amj.
Kind et al.: Relationship Discovery with NetFlow to Enable Business-Driven IT Management. IEEE Xplore, Conference: Business-Driven IT Management, 2006, pp. 63-70 DOI:10.1109/BDIM.2006.1649212 (2006).
PCT/US2021/058748 International Search Report and Written Opinion dated Feb. 9, 2022.
U.S. Appl. No. 17/372,238 Final Office Action dated Apr. 19, 2022.
U.S. Appl. No. 17/372,242 Final Office Action dated Mar. 4, 2022.
U.S. Appl. No. 17/372,247 Final Office Action dated Apr. 26, 2022.
U.S. Appl. No. 17/372,251 Final Office Action dated Feb. 22, 2022.
U.S. Appl. No. 17/372,256 Final Office Action dated Feb. 18, 2022.
U.S. Appl. No. 17/372,267 Final Office Action dated Feb. 9, 2022.
U.S. Appl. No. 17/372,267 Non-Final Office Action dated Jul. 21, 2022.
U.S. Appl. No. 17/372,267 Final Office Action dated Oct. 24, 2022.
U.S. Appl. No. 17/372,247 Non-Final Office Action dated Nov. 14, 2022.

\* cited by examiner

SUBTENDED DEVICE MAPPING THROUGH CONTROLLER INTROSPECTION

CROSS-REFERENCE TO RELATED APPLICATIONS

This application is related to co-pending applications U.S. application Ser. No. 17/372,238, U.S. application Ser. No. 17/372,242, U.S. application Ser. No. 17/372,247, U.S. application Ser. No. 17/372,251, U.S. application Ser. No. 17/372,256, and U.S. application Ser. No. 17/372,267, all filed on the same date, Jul. 9, 2021, the same date on which the present application was filed. This application claims the priority and benefit of U.S. Provisional Application No. 63/112,268, filed Nov. 11, 2020, and entitled: DATA INTEGRATION AND ENRICHMENT PLATFORM FOR AUTOMATED INDUSTRIAL AND COMMERCIAL ENVIRONMENTS. All of these applications are incorporated herein by reference in their entireties.

BACKGROUND

Automation is the use of control systems to operate processes without human intervention. These systems generally include software, computers, beacons, sensors, actuators, and in some cases robotics. In industrial and commercial settings, benefits of automation include increases in productivity, accuracy, flexibility, and safety, while providing overall cost savings. A "smart building" uses a combination of technologies to automate building management. The terms "smart office" and "smart home" are used to describe a structure that uses technology to allow systems and electronics to communicate with one another, be controlled by a time schedule, and even be remotely activated from a smartphone or other web-enabled device. A few of the systems that can be controlled include lighting, heating, ventilation, air conditioning, vertical lifts, fire safety systems, appliances, and security systems. As such, smart buildings can provide comfort and convenience while enhancing security and energy efficiency. Cities of the future are anticipated to offer a wide array of "smart technologies," e.g., networked technology that controls aspects of transportation, energy, air, and water quality.

SUMMARY

Automated industrial and commercial environments are often the amalgamation of commodity components orchestrated through a Programmable Logic Controller (PLC) that was installed with custom logic by a third-party system integrator. These components may be internet-connected devices, sometimes called Internet of Things (IoT). Often times the exact logic contained in the PLC is not accessible for various reasons. For example, it might have been a decade or more since the PLC was configured and the integrator is no longer in business, or the integrator never provided credentials in order to maintain job security. While the automated environment might be flawlessly performing the task it was designed to perform, the owner or an interested party might want to better understand what logic exists, perhaps to build a digital twin of the environment. Further, significant value in comes from understanding the transitive and implicit relationships within the environment, such as geospatial relationships. These transitive and implicit relationships exist beyond the programming in the PLC. Understanding the explicitly defined, implicit, or transitive relationships usually requires that the existing environment be reverse engineered by hand, either directly in the PLC or through manually documenting all the devices and their relationships, which can take anywhere from a few weeks to a year, depending on the size and complexity of the environment.

The commercial and/or industrial environment often consist of a large number of IoT devices that are controlled by a smaller number of controllers (e.g., PLCs). The controllers control the individual IoT devices through, for example, relays and/or communication buses, such as BACnet or Modbus. Each controller often controls a few of subtended devices (e.g., IoT devices). These controllers may in turn controlled by a supervisory or executive controller. For each controller, the IoT devices it controls are mapped from southbound control buses, GPIO ports, or relays to northbound control buses, with the controller acting as a gateway between the IoT devices. This configuration makes it difficult to understand the subtended devices (e.g., IoT devices) through automated means and thus human is required to work on finding out this information.

Some of the protocols used for control allow controller to disclosure subtended device information, but it is not always typical. Some controller may have documentations that documented the subtended devices, but these documentations are not always available, especially considering if it is an automated environment built years ago, with additions over years, etc.

Described herein are platforms, systems, and methods that automatically identify, monitor data sources (e.g., IoT devices) and controllers in an automation environment, and determine the subtended devices controlled by the controllers, and map the data collected by subtended devices for the purpose to present to the data owner to take further informed actions.

The subject matter described herein includes platforms, systems, and methods that provide mechanisms to speed the identification of relationships between the controller and the subtended devices (e.g., components in the automated environment, IoT devices in the automated environment, etc.). By utilizing the subject matter described herein, the system may identify this relationship and map the data from IoT devices quickly and thoroughly. The following components, in various embodiments, are needed to implement the platforms, systems, and methods described herein:

Data or data source discovery mechanism;
Introspection directive storage mechanism;
Directive identification mechanism;
Communication mechanism;
Introspection module mechanism; and
Data storage system.

Accordingly, in one aspect, disclosed herein are computer-implemented methods comprising: maintaining, at a data store, a plurality of introspection directives, each introspection directive comprising a sequence of instructions specific to a communications protocol, the sequence of instructions comprising instructions to send at least one command to at least one controller associated with an automation environment in accordance with the communications protocol, instructions to receive a response to the at least one command, and instructions to parse the response; identifying an appropriate introspection directive for the at least one controller; and executing the sequence of instructions with respect to the at least one controller to perform operations comprising: sending at least one command to at least one controller; receiving a response to the at least one command from the at least one controller; and parsing the response to discover one or more data sources subtended to the at least one controller and how they are mapped in the at least one controller. In some embodiments, the method further comprises accessing authentication credentials for the at least one controller required to access configuration information. In various embodiments, the data store comprises a local or remote database, a flat filesystem, a memory, or a combination thereof. In some embodiments, the automation environment comprises at least one networked industrial or commercial automation system. In some embodiments, the at least one controller is centralized. In other embodiments, the at least one controller is distributed. In some embodiments, the at least one controller comprises a programmable logic controller (PLC). In various embodiments, the identifying an appropriate introspection directive for the at least one controller comprises passive discovery, active discovery, target interrogation, or a combination thereof. In further embodiments, the passive discovery comprises observing traffic on a network. In still further embodiments, the passive discovery comprises identifying an origin or a destination for the traffic on the network. In various further embodiments, the active discovery comprises accessing a configuration, IP subnet scanning on a network, port scanning on a network, protocol specific ID enumeration on a control bus, issuing protocol specific discovery commands on a network, or a combination thereof. In various further embodiments, the target interrogation comprises introspecting a parent device, peer device, or child device. In various embodiments, the at least one command is sent to at least one controller and the response is received from the at least one controller over a wired network, a wireless network, or a combination thereof. In various embodiments, the communications protocol comprises a control protocol, a supervisory protocol, an administrative protocol, an industrial protocol, or a combination thereof. In some embodiments, the communications protocol comprises Hypertext Transfer Protocol (HTTP). In further embodiments, the at least one command comprises one or more Uniform Resource Locators (URLs) to which to send one or more GET/POST requests. In still further embodiments, the instructions to parse the response comprise content to scrape from the response or one or more files to download. In various embodiments, the communications protocol comprises Telnet, Secure Shell (SSH), or serial console port communications. In further embodiments, the at least one command comprises one or more text based or binary commands. In further embodiments, the instructions to parse the response comprise one or more expected responses. In some embodiments, the method further comprises identifying the make and model of the at least one controller. In some embodiments, the at least one controller utilizes a first communications protocol for control, sensing, or eventing and a second communications protocol for programming or configuration. In other embodiments, the at least one controller utilizes a the same communications protocol for control, sensing, or eventing and for programming or configuration. In various embodiments, the one or more data sources subtended to the at least one controller comprises at least one sensor, at least one actuator, at least one effector, at least one automation controller, at least one programmable logic controller (PLC), at least one data file, at least one cloud service, or a combination thereof. In various embodiments, the one or more data sources subtended to the at least one controller comprises at least 1,000, at least 10,000, or at least 100,000 data sources. In various embodiments, the response comprises field mappings, source code, compiled code, a full system backup for the at least one controller, or a combination thereof. In some embodiments, one or more of the identifying an appropriate introspection directive and the executing the sequence of instructions are performed by a gateway in communication with the automation environment. In some embodiments, one or more of the identifying an appropriate introspection directive and the executing the sequence of instructions are performed by a computing device in communication with the automation environment. In some embodiments, the steps are performed by a computer-based platform automatically.

In another aspect, disclosed herein are computer-based platforms and systems comprising at least one computing device comprising at least one processor, a memory, and instructions executable by the at least one processor to create an application comprising: a data store comprising a plurality of introspection directives, each introspection directive comprising a sequence of instructions specific to a communications protocol, the sequence of instructions comprising instructions to send at least one command, instructions to receive a response to the at least one command, and instructions to parse the response; a communication module configured to communicate with at least one controller associated with an automation environment in accordance with the communications protocol; and an introspection module configured to identify an appropriate introspection directive for the at least one controller and execute the sequence of instructions with respect to the at least one controller to discover data sources subtended to the at least one controller and how they are mapped in the at least one controller. In some embodiments, the application further comprises a credential retrieval module configured to access authentication credentials for the at least one controller required to access configuration information. In various embodiments, the data store comprises a local or remote database, a flat filesystem, a memory, or a combination thereof. In some embodiments, the automation environment comprises at least one networked industrial or commercial automation system. In some embodiments, the at least one controller is centralized. In other embodiments, the at least one controller is distributed. In some embodiments, the at least one controller comprises a programmable logic controller (PLC). In various embodiments, the introspection module identifies an appropriate introspection directive for the at least one controller by passive discovery, active discovery, target interrogation, or a combination thereof. In further embodiments, the passive discovery comprises observing traffic on a network. In still further embodiments, the passive discovery comprises identifying an origin or a destination for the traffic on the network. In various further embodiments, the active discovery comprises accessing a configuration, IP subnet scanning on a network, port scanning on a network, protocol specific ID enumeration on a control bus, issuing protocol specific discovery commands on a network, or a combination thereof. In various further embodiments, the target interrogation comprises introspecting a parent device, peer device, or child device. In various embodiments, the introspection module sends the at least one command to the at least one controller and receives the response from the at least one controller over a wired network, a wireless network, or a combination thereof. In various embodiments, the communications protocol comprises a control protocol, a supervisory protocol, an administrative protocol, an industrial protocol, or a combination thereof. In some embodiments, the communications protocol comprises Hypertext Transfer Protocol (HTTP). In further embodiments, the at least one command comprises one or more Uniform Resource Locators (URLs) to which to send one or more GET/POST requests. In still further embodiments, the instructions to parse the response comprise content to scrape from the response or one or more files to download. In various embodiments, the communications protocol comprises Telnet, Secure Shell (SSH), or serial console port communications. In further embodiments, the at least one command comprises one or more text based or binary commands. In further embodiments, the instructions to parse the response comprise one or more expected responses. In some embodiments, the application further comprises a discovery module configured to identify the make and model of the at least one controller. In some embodiments, the at least one controller utilizes a first communications protocol for control, sensing, or eventing and a second communications protocol for programming or configuration. In other embodiments, the at least one controller utilizes a the same communications protocol for control, sensing, or eventing and for programming or configuration. In various embodiments, the one or more data sources subtended to the at least one controller comprises at least one sensor, at least one actuator, at least one effector, at least one automation controller, at least one programmable logic controller (PLC), at least one data file, at least one cloud service, or a combination thereof. In various embodiments, the one or more data sources subtended to the at least one controller comprises at least 1,000, at least 10,000, or at least 100,000 data sources. In various embodiments, the response comprises field mappings, source code, compiled code, a full system backup for the at least one controller, or a combination thereof. In some embodiments, the application is implemented at a gateway in communication with the automation environment. In some embodiments, the application is implemented at a computing device in communication with the automation environment. In some embodiments, the modules are implemented at a computer-based platform and operate automatically.

In another aspect, disclosed herein are non-transitory computer-readable storage media encoded with instructions executable by one or more processors to provide an application comprising: a plurality of introspection directives, each introspection directive comprising a sequence of instructions specific to a communications protocol, the sequence of instructions comprising instructions to send at least one command, instructions to receive a response to the at least one command, and instructions to parse the response; a communication module configured to communicate with at least one controller associated with an automation environment in accordance with the communications protocol; and an introspection module configured to identify an appropriate introspection directive for the at least one controller and execute the sequence of instructions with respect to the at least one controller to discover data sources subtended to the at least one controller and how they are mapped in the at least one controller. In some embodiments, the application further comprises a credential retrieval module configured to access authentication credentials for the at least one controller required to access configuration information. In various embodiments, the plurality of introspection directives are stored at a local or remote database, a flat filesystem, a memory, or a combination thereof. In some embodiments, the automation environment comprises at least one networked industrial or commercial automation system. In some embodiments, the at least one controller is centralized. In other embodiments, the at least one controller is distributed. In some embodiments, the at least one controller comprises a programmable logic controller (PLC). In various embodiments, the introspection module identifies an appropriate introspection directive for the at least one controller by passive discovery, active discovery, target interrogation, or a combination thereof. In further embodiments, the passive discovery comprises observing traffic on a network. In still further embodiments, the passive discovery comprises identifying an origin or a destination for the traffic on the network. In various further embodiments, the active discovery comprises accessing a configuration, IP subnet scanning on a network, port scanning on a network, protocol specific ID enumeration on a control bus, issuing protocol specific discovery commands on a network, or a combination thereof. In various further embodiments, the target interrogation comprises introspecting a parent device, peer device, or child device. In various embodiments, wherein the introspection module sends the at least one command to the at least one controller and receives the response from the at least one controller over a wired network, a wireless network, or a combination thereof. In various embodiments, the communications protocol comprises a control protocol, a supervisory protocol, an administrative protocol, an industrial protocol, or a combination thereof. In some embodiments, the communications protocol comprises Hypertext Transfer Protocol (HTTP). In further embodiments, the at least one command comprises one or more Uniform Resource Locators (URLs) to which to send one or more GET/POST requests. In still further embodiments, the instructions to parse the response comprise content to scrape from the response or one or more files to download. In various embodiments, the communications protocol comprises Telnet, Secure Shell (SSH), or serial console port communications. In further embodiments, the at least one command comprises one or more text based or binary commands. In further embodiments, the instructions to parse the response comprise one or more expected responses. In some embodiments, the application further comprises a discovery module configured to identify the make and model of the at least one controller. In some embodiments, the at least one controller utilizes a first communications protocol for control, sensing, or eventing and a second communications protocol for programming or configuration. In other embodiments, wherein the at least one controller utilizes a the same communications protocol for control, sensing, or eventing and for programming or configuration. In various embodiments, one or more data sources subtended to the at least one controller comprises at least one sensor, at least one actuator, at least one effector, at least one automation controller, at least one programmable logic controller (PLC), at least one data file, at least one cloud service, or a combination thereof. In various embodiments, the one or more data sources subtended to the at least one controller comprises at least 1,000, at least 10,000, or at least 100,000 data sources. In various embodiments, the response comprises field mappings, source code, compiled code, a full system backup for the at least one controller, or a combination thereof. In some embodiments, the application is implemented at a gateway in communication with the automation environment. In some embodiments, the application is implemented at a computing device in communication with the automation environment. In some embodiments, the modules are implemented at a computer-based platform and operate automatically.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
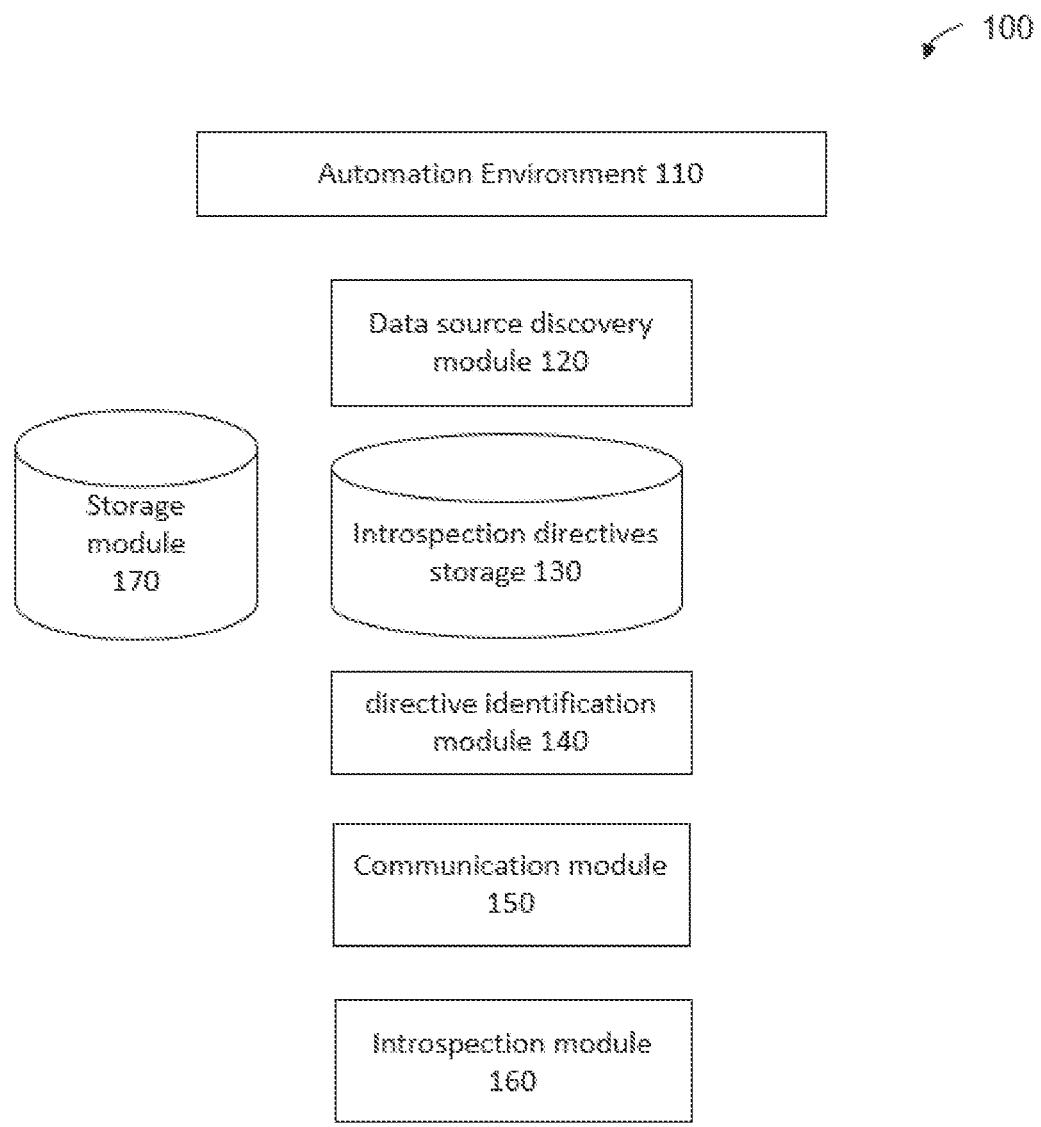
FIG. 1 shows a non-limiting example of a schematic diagram; in this case, a schematic diagram showing components (e.g., modules, mechanisms, etc.) utilized by embodiments described herein.

Described herein, in certain embodiments, are computer-implemented methods comprising: maintaining, at a data store, a plurality of introspection directives, each introspection directive comprising a sequence of instructions specific to a communications protocol, the sequence of instructions comprising instructions to send at least one command to at least one controller associated with an automation environment in accordance with the communications protocol, instructions to receive a response to the at least one command, and instructions to parse the response; identifying an appropriate introspection directive for the at least one controller; and executing the sequence of instructions with respect to the at least one controller to perform operations comprising: sending at least one command to at least one controller; receiving a response to the at least one command from the at least one controller; and parsing the response to discover one or more data sources subtended to the at least one controller and how they are mapped in the at least one controller.

Also described herein, in certain embodiments, are computer-based platforms and systems comprising at least one computing device comprising at least one processor, a memory, and instructions executable by the at least one processor to create an application comprising: a data store comprising a plurality of introspection directives, each introspection directive comprising a sequence of instructions specific to a communications protocol, the sequence of instructions comprising instructions to send at least one command, instructions to receive a response to the at least one command, and instructions to parse the response; a communication module configured to communicate with at least one controller associated with an automation environment in accordance with the communications protocol; and an introspection module configured to identify an appropriate introspection directive for the at least one controller and execute the sequence of instructions with respect to the at least one controller to discover data sources subtended to the at least one controller and how they are mapped in the at least one controller.

Also described herein, in certain embodiments, are non-transitory computer-readable storage media encoded with instructions executable by one or more processors to provide an application comprising: a plurality of introspection directives, each introspection directive comprising a sequence of instructions specific to a communications protocol, the sequence of instructions comprising instructions to send at least one command, instructions to receive a response to the at least one command, and instructions to parse the response; a communication module configured to communicate with at least one controller associated with an automation environment in accordance with the communications protocol; and an introspection module configured to identify an appropriate introspection directive for the at least one controller and execute the sequence of instructions with respect to the at least one controller to discover data sources subtended to the at least one controller and how they are mapped in the at least one controller.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

As used herein, the "Internet of Things" or "IoT" refers to the network of physical devices, buildings, vehicles, and other objects that feature an IP address for internet network connectivity for exchanging data, wherein the network comprises, for example, ethernet, IP, serial buses, and/or other forms of communication between two or more IoT devices.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular structures, features, or characteristics may be combined in any suitable manner in one or more embodiments.

Automation Environment

In some embodiments, the platforms, systems, and methods described herein are implemented in relation to an automation environment. In further embodiments, the automation environment comprises electronically controllable equipment with one or more sensors, one or more actuators, and/or one or more effectors, as well as one or more automation controllers—either centralized and/or distributed. As this environment is the target of the logic and functionality described herein, the environment, in some cases, exists before the platforms, systems, and methods described herein are applied to it. In other cases, the environment is implemented with, e.g., proximate in time to, the platforms, systems, and methods described herein.

Many automation environments are suitable, including, by way of non-limiting examples, industrial environments, such as manufacturing environments and assembly environments, infrastructure, transportation, freight or shipping environments, smart cities, agricultural environments, military environments, law enforcement environments, commercial environments, such as smart building environments, smart office environments, healthcare environments, and retail environments, as well as residential environments, such as smart home environments, and the like. In some embodiments, the automation environments include cloud storage and/or computing system.

In various embodiments, the electronically controllable equipment comprises, by way of non-limiting examples, a smart manufacturing device (e.g., a robot, manufacturing actuator, assembly line sensor, etc.), a utility device (e.g., a water meter, transformer, gas meter, etc.), pipeline monitoring device, power plant monitoring device, electrical grid monitoring device, an environmental sensor (e.g., a carbon dioxide sensor, pollution detector, salinity meter, light meter, etc.), a weather sensor (e.g., humidity sensor, temperature sensor, rain gauge, anemometer, barometer, etc.), a transportation asset (e.g., a car, truck, watercraft, train, bus, aircraft, unmanned vehicle, GPS receiver, etc.), a freight or shipping asset (e.g., a shipping container, cargo, truck, rail car, watercraft, aircraft, etc.), a smart city device (e.g., a parking meter, utility meter, lighting device, traffic monitoring camera, emergency calling device, etc.), an agriculture device (e.g., a farming machine, soil sensor, irrigation device, etc.), a homeland security device (e.g., a body scanner, metal detector, radiation detector, biological agent detector, weapon, vehicle, drone, perimeter intrusion detector, gunfire locator, breathalyzer, etc.), a smart office device (e.g., an access control device, security system, HVAC system, vertical lifts, fire safety system, lighting system, printer, coffee maker, etc.), a point-of-sale (PoS) system (e.g., a payment device, receipt printer, barcode or QR code scanner, etc.), a health care device (e.g., a drug infusion pump, pacemaker, defibrillator, patient health monitoring device, etc.), as well as a smart home device (e.g., a security system, door lock, lighting device, appliance, thermostat, smoke detector, virtual assistant, smart speaker, etc.), and the like.

Data Sources

As described herein, in some embodiments, the automation environment comprises one or more pieces of electronically controllable equipment. In further embodiments, the electronically controllable equipment further comprises one or more of the following components: a microcontroller (MCU), a microprocessor (MPU), a memory or storage component, firmware, software, a networking/communications component, a sensing component (e.g., a sensor), an electronic circuit connected to the sensing component, an actuating component (e.g., an actuator and/or an effector), an electronic circuit connected to the actuating component, and an energy source. In some embodiments, one or more of the components are physically separate from a piece of electronically controllable equipment. In some embodiments, one or more of the components are integrated with, or embedded in, a piece of electronically controllable equipment.

In some embodiments, the automation environment comprises one or more cloud storage and/or computing systems, which in some cases are located remotely from the data integration pipeline. For example, some devices (e.g., pieces of electronically controllable equipment) are configured to communicate with a cloud storage and/or computing system. In these embodiments, the data integration pipeline discovers and/or extracts data from cloud APIs. In some embodiments, the data integration pipeline processes data both from on-premise systems and cloud systems.

In some embodiments, the networking/communication element includes a receiver, a transmitter, and/or a transceiver. In further embodiments, the networking/communication element comprises a radio frequency (RF) transceiver with an antenna or connection for an external antenna. Suitable transceivers include, by way of non-limiting examples, a Wi-Fi transceiver, a cellular transceiver, a Bluetooth transceiver, and the like.

In some embodiments, the electronically controllable equipment, or components thereof, comprises an IP address for internet connectivity. In further embodiments, the equipment may be associated with a MAC address or an SSID. It is understood that equipment may connect with other devices through wired or wireless connections, which allow for transfer (e.g., transmission, reception, or both) of data.

In some embodiments, the automation environment comprises one or more networks via which the electronically controllable equipment, or components thereof, sends and/or receives data. In various embodiments, the network comprises ethernet, IP, serial buses, and other forms of communication between two or more IoT devices. In further embodiments, the one or more networks comprise one or more IoT networks, one or more data packet-switched networks, one or more wireless sensor networks (WSN), and/or one or more wireless sensor and actuator networks (WSAN). In various embodiments, a network described herein is wireless network utilizing Wi-Fi, WiMAX, ZigBee, Z-Wave, Bluetooth, Bluetooth Low Energy (BLE), Near-Field Communication (NFC), or Light-Fidelity (Li-Fi). In some embodiments, a network described herein is wireless network utilizing LTE or 5G. In some embodiments, a network described herein is wireless network utilizing a low-power wide-area network (LPWAN) protocol, such as LoRa. In other embodiments, a network described herein is wired network utilizing Ethernet, serial, RS422 or RS485 serial bus, 1-Wire, CAN, DMX, or power line communication.

In some embodiments, one or more devices form nodes in the network. In some embodiments, a network described herein includes a central node for controlling the network. In some embodiments, the automation environment comprises electronically controllable equipment, or components there, that have hierarchical relationships, such as a controller/controlled relationship, a master/slave relationship, or the like. In some embodiments, a network described herein has a distributed architecture to reduce the impact of a failed device or node. In some embodiments, a network described herein consists of a peer-to-peer relationship between two or more devices.

The automation environment suitably comprises a wide range of numbers of data sources, including, by way of examples, pieces of electronically controllable equipment, local and remote data stores, and remote cloud computing services/resources, including APIs to provide data from remote computing services/resources. In various embodiments, the automation environment suitably comprises, by way of non-limiting examples, at least 5, at least 10, at least 50, at least 100, at least 500, at least 1,000, at least 5,000, at least 10,000, at least 50,000, or at least 100,000 data sources, including increments therein. In various further embodiments, the automation environment suitably comprises, by way of non-limiting examples, at least 500,000, at least 1,000,000, at least 5,000,000, at least 10,000,000, at least 50,000,000, at least 100,000,000, or at least 500,000,000 data sources, including increments therein.

In some embodiments, the automation environment comprises an automation controller, either centralized or distributed. For example, in some embodiments, the automation environment comprises one or more programmable logic controllers (PLC). A PLC is a microprocessor-based controller with programmable memory used to store program instructions and functions. In some embodiments, one or more of the PLCs are ruggedized. In various embodiments, a PLC comprises a processor unit (MCU or the MPU) which interprets inputs, executes the control program stored in memory, and sends output signals, a power supply unit which, in some cases, converts AC voltage to DC, a memory unit storing data from inputs and program instructions to be executed by the processor unit, an input and output interface, by which the PLC sends data to external devices and receives data from external devices, and a communications interface to receive and transmit data on communication networks. In further embodiments, a PLC comprises a real-time operating system, such as OS-9, Sedona, Niagara, or VxWorks. In various embodiments, PLC functionality includes, by way of examples, sequential relay control, motion control, process control, distributed control systems, and networking. In particular embodiments, a PLC is programmed with a device used to develop and later download a program into the memory of the PLC. The programming device, in various cases, includes a desktop console, special software on a personal computer, or a handheld programming device. In some cases, the program is downloaded to the PLC directly or over a network and stored either in non-volatile flash memory or battery-backed-up RAM.

In some embodiments, the MCU or the MPU receives data from a sensing component and transmits the data to the transmitter or transceiver to be transmitted to other remotely located elements within a network. In some embodiments, the receiver or transceiver receives data, for example, control data from remotely located devices, and such data gets relayed to the MCU or the MPU to generate commands to one or more other components. In such embodiments, a sensing component and/or an actuation component performs one or more functions(s) based on the received command. In some embodiments, an electrical circuit is utilized in data transfer among a sensing component, an actuation component, the MCU or MPU, and the networking/communications element.

Many sensors are suitable including, by way of non-limiting examples, GPS receivers, wearable sensors, mobile sensors, fixed sensors, and the like. In various embodiments, the electronically controllable equipment, or components thereof, and/or networks described herein comprise one or more of: an audio/acoustic sensor, a breathalyzer, a temperature sensor, a carbon dioxide sensor, a carbon monoxide sensor, an infrared sensor, an oxygen sensor, an ozone monitor, a pH sensor, a smoke detector, an electrical current sensor, an electrical voltage detector, a magnetometer, a metal detector, a radio direction finder, an air flow meter, an anemometer, a flow sensor, a gas meter, a water meter, a Geiger counter, an altimeter, an air speed indicator, a depth gauge, a gyroscope, a compass, an odometer, a shock detector, a barometer, a pressure gauge, a thermometer, a proximity sensor, a motion detector, an occupancy sensor, an inertial sensor, a gyroscope, or any combination thereof, and in some embodiments, sensor data comprises information obtained from any of the sensors described herein. Other examples of sensors include, but are not limited to, location sensors, vision sensors (e.g., imaging devices capable of detecting visible, infrared, or ultraviolet light, such as cameras, etc.), proximity sensors (e.g., ultrasonic sensors, LiDAR, time-of-flight cameras, etc.), inertial sensors (e.g., accelerometers, gyroscopes, inertial measurement units (IMUs), etc.), and field sensors (e.g., magnetometers, electromagnetic sensors, etc.). In particular embodiments, one or more sensors are configured to measure health parameters such as heart rate, pulse, electric signals from the heart, blood oxygen levels, blood pressure, blood sugar level, and the like. In particular embodiments, one or more sensors are configured to measure environmental parameters such as light, motion, temperature, pressure, humidity, vibration, magnetic field, sound, smoke, carbon monoxide, radiation, hazardous chemicals, acid, base, reactive compounds, volatile organic compounds, smog, and the like.

Any suitable number and combination of sensors can be used, such as one, two, three, four, five, or more sensors. Optionally, the data can be received from sensors of different types (e.g., two, three, four, five, or more types). Sensors of different types may measure different types of signals or information and/or utilize different types of measurement techniques to obtain data. For instance, the sensors may include any suitable combination of active sensors (e.g., sensors that generate and measure energy from their own source) and passive sensors (e.g., sensors that detect available energy).

Suitable actuators include, by way of non-limiting examples, electric (e.g., a motor, servo, solenoid, piezoelectric actuator, etc.), hydraulic, pneumatic (e.g., vacuum- or compressed gas-based actuators), magnetic, thermal (e.g., shape memory alloy-based actuators), soft, and mechanical actuators.

Suitable effectors include, by way of non-limiting examples, impactive, ingressive, astrictive, and contigutive effectors.

Overview of Exemplary Embodiments

The platforms, systems, and methods described herein interact with an automation environment and are implemented with multiple suitable architectures. Non-limiting examples are provided herein.

Referring to FIG. 1, in a particular embodiment, the platforms and systems 100 include, and methods utilize, an automation environment 110, a data source discovery/identification 120, an introspection directives storage 130, a directive identification module 140, a communication module 150, an introspection module 160, and a storage module 170.

Figure 2:
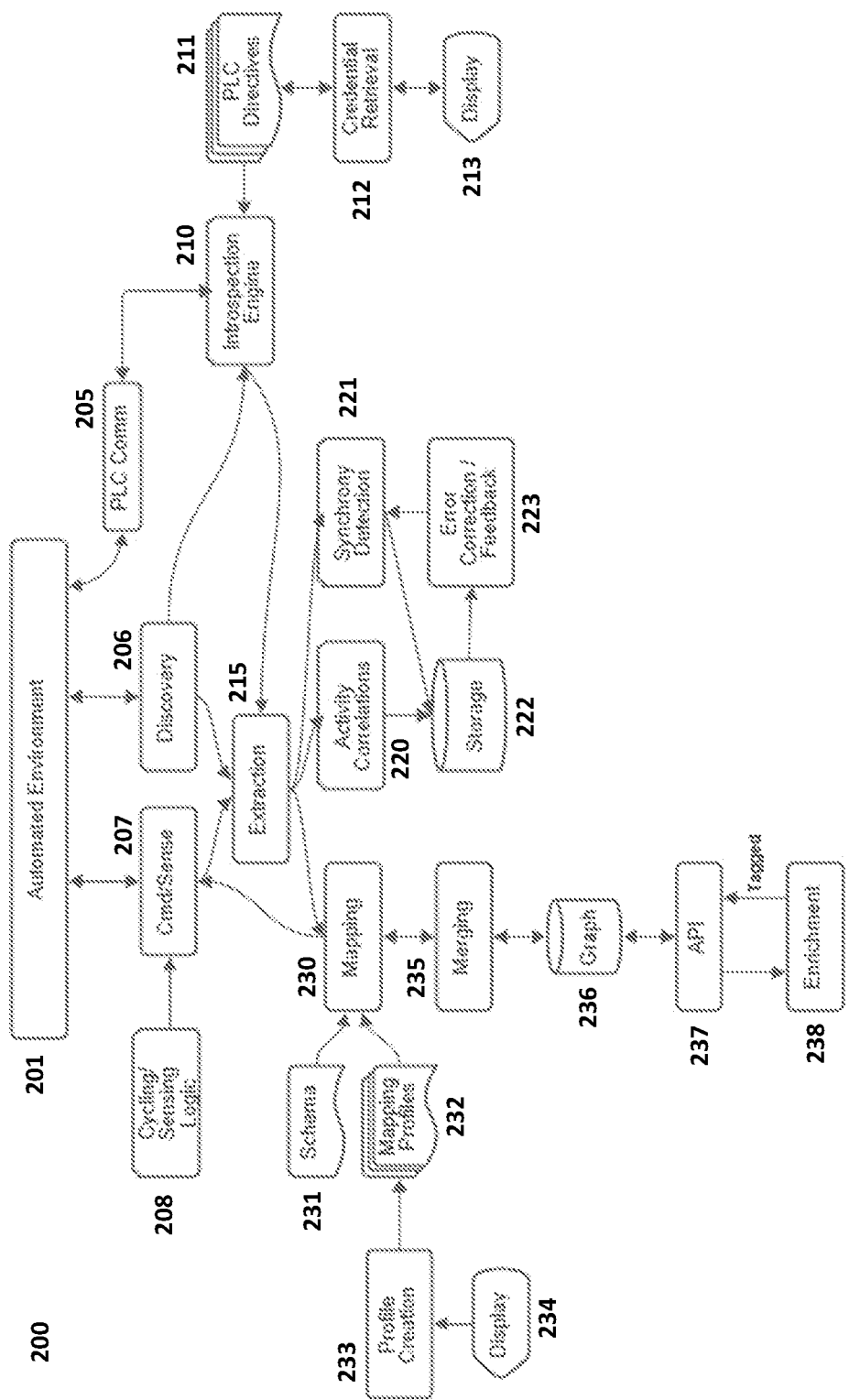
FIG. 2 shows a non-limiting example of a schematic diagram; in this case, a schematic diagram illustrating overall architecture and procedural aspects of the platforms, systems, and methods described herein.

Referring to FIG. 2, in a particular embodiment, the overall platforms and systems 200 are implemented in relation to an automation environment 201, and the methods utilize the automation environment 201. In this embodiment, a discovery module 206 and a command/sense module 207 interact directly with the automation environment 201 to conduct protocols to gain data about the environment and feed the data to an extraction module 215. The discovery module 206 provides data to an introspection engine 210, which communicates with a PLC communications module 205. In this embodiment, the introspection engine 210 receives one or more PLC directives 211, which may require credential retrieval 212 and presentation of an interface for showing credentials on a display 213 and/or receiving credentials, and the introspection engine 210 sends the PLC directives 211 to the PLC communications module 205 for issuance into the automation environment 201. Further, in this embodiment, a cycling/sensing logic module 208 provides instruction to the command/sense module 207 for interaction with the automation environment 201.

Continuing to refer to FIG. 2, in this particular embodiment, the command/sense module 207, the discovery module 206, and the introspection engine 210 provide data to the extraction module 215. In this embodiment, the extraction module 215 provides data to the activity correlations module 220 and the synchrony detection module 221, which are in communication with a storage module 222 and an error correction and feedback mechanism 223. In this embodiment, the extraction module 215 also provides data to the mapping module 230. By way of example, the mapping module 230 receives a mapping schema 231 and one or more mapping profiles 232, which may require profile creation 233 and presentation of an interface for showing profiles on a display 234 and/or receiving profiles. The mapping module 230 utilizes the schema 231 and the one or more profiles 232 to map the data extracted by the extraction module 215 and communicates the output to a merging module 235. Finally, in this embodiment, the merging module 235 is in communication with a graph database 236. An enrichment module 238 provides data enrichments, such as tagging (e.g., origin tagging, etc.), and access to the graph database 236 and the enrichments is provided via one or more APIs 237.

Figure 3:
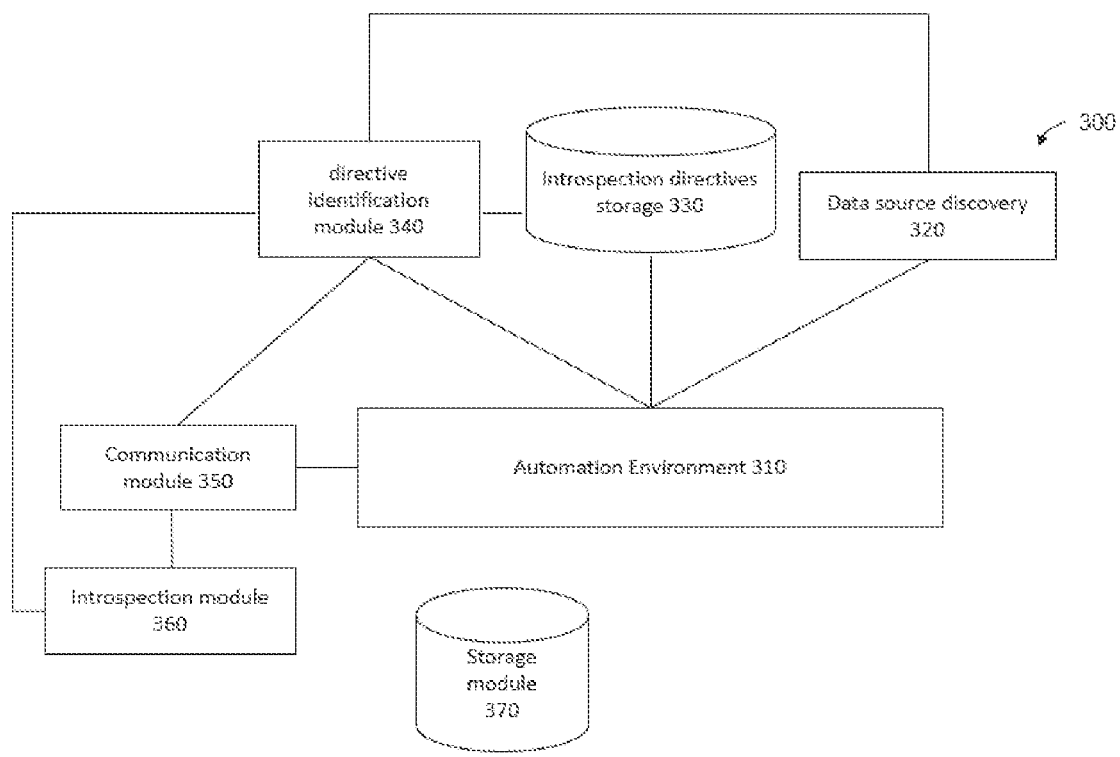
FIG. 3 shows a non-limiting example of a schematic diagram; in this case, a schematic diagram illustrating architecture and procedural aspects of the platforms, systems, and methods for subtended device mapping through controller introspection according to embodiments described herein.

Referring to FIG. 3, in a particular embodiment, the subtended device mapping through controller introspection 300 is implemented in relation to an automation environment 310, and the methods utilize the automation environment 310. In this embodiment, a data source discovery/identification module 320 interact with the automation environment 310 to conduct protocols to gain data about the environment and to identify data sources in the automation environment 310. In some embodiments, the data source discovery/identification module 320 interact with the automation environment 310 to conduct protocols to identify controllers in the automation environment 310. An introspection directive storage 330 stores a plurality of introspection directives. In some embodiments, each introspection directive comprises a sequence of instructions specific to a communications protocol; the sequence of instructions may comprise instructions to send a command to a controller associated with the automation environment in accordance with the communications protocol, to receive a response to the command, and to parse the response. A directive identification module 340 may interact with the data source discovery module 320 to receive certain information about a discovered controller. The directive identification module 340 may then query the introspection directives storage 340 to identify one introspection directive from the plurality of introspection directives for the discovered controller (e.g., based on the communications protocol the discovered controller operates upon). The communication module 350 may communication with the discovered controller in accordance with the protocol associated with discovered controller. In some embodiments, the communication module 350 may send the identified introspection directive to the corresponding controller. An introspection module 360 may interact with the communication module 350 to send the identified introspection directive to the corresponding controller. In some embodiments, the introspection module 360 may receive the identified introspection directive directly from the directive identification module 340 and introspect the corresponding controller directly without the aid of the communication module 350. In some other embodiments, the introspection module 360 may query the introspection directives storage 330 directly without the aid of directive identification module 340 and identify the suitable introspection directive for a controller and execute the sequence of instructions to discover data sources (e.g., IoT devices) subtended to the controller, and/or data mapping information about the data sources. A storage unit 370 (e.g., a graph database) may store, in addition to other data storages, the results from the introspection module 370.

Figure 4:
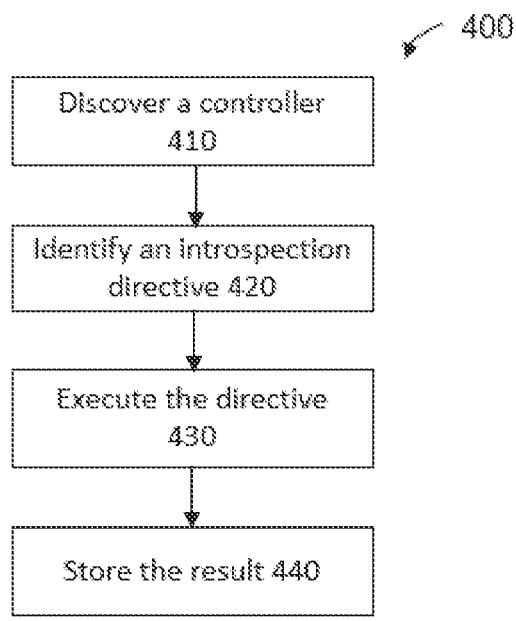
FIG. 4 shows a non-limiting example of a process flow diagram; in this case, a process flow diagram illustrating subtended device mapping through controller introspection according to embodiments described herein.

Referring to FIG. 4, in a particular embodiment, in a particular embodiment, a process for subtended device mapping through controller introspection 400 begins with discovering one or more controllers 410. Identifying controllers associated with the automation environment, in this embodiments, comprises one or more of passive discovery, active discovery, and target interrogation methodologies. The identified controllers may include centralized controllers, distributed controllers, and programmable logic controller (PLC). The next step is to identify 420 an introspection directive. In some embodiments, the identification of an appropriate introspection directive may be based on the communications protocol that the controller uses. In some embodiments, the identification of an appropriate introspection directive for the discovered controller may comprise passive discovery, active discovery, target interrogation, or a combination thereof. In some embodiments, the passive discovery comprises observing traffic on a network. In some other embodiments, the passive discovery comprises identifying an origin or a destination for the traffic on the network. The active discovery, in some embodiments, comprises accessing a configuration, IP subnet scanning on a network, port scanning on a network, protocol specific ID enumeration on a control bus, issuing protocol specific discovery commands on a network, or a combination thereof. In some embodiments, the target interrogation comprises introspecting a parent device, peer device, or child device. The method proceeds to execute 430 the identified directive to the controller. In some embodiments, the execution of the directive comprises sending at least one command to the controller; receiving a response to the command from the controller; and parsing the response to discover one or more data sources (e.g., IoT devices) subtended to the controller and how they are mapped in the controller. Next, the process 400 proceed to store 440 the result from the execution of the directive in a data store. This result may provide actionable information of the data sources and the controller to the data owner.

Data or Data Source Discovery Mechanism

One component of the platforms and systems described herein, and utilized by the methods described herein is the data or data source discovery mechanism. See, e.g., FIG. 1 at 120, FIG. 2 at 206, and FIG. 3 at 320. This will vary based on the environment the system is targeting but, in various embodiments, includes one or more of: passive discovery, active discovery, and target interrogation. Passive discovery is typically done by observing network traffic, whether IP, serial, or otherwise, between the potential data sources. When a known protocol is used, the origin and destination are recorded as a potential data source. Active discovery is usually protocol specific, but can range from "whois" commands in protocols like BACnet to IP subnet and port scanning for IP based systems. Again, when a device is found that speaks a desired protocol, it is recorded as a potential data source. Lastly, target interrogation includes actively speaking one or more protocols to a potential target to obtain additional information. In general, a known or discovered device is interrogated to find out about other known devices—and when more devices are found, they are similarly interrogated. Additionally, data sources can also be found in file shares or be manually entered, such as a cloud service. In some embodiments, the data or data source discovery mechanism may discover controllers associated with the automation environment. The controllers may be centralized controllers, distributed controllers, and/or PLCs. In an automation environment, a controller may control a number of equipment or devices (e.g., data sources or IoT devices). In some embodiments, the discovery of controllers comprises accessing authentication credentials for the controllers that is required to access configuration information.

In some embodiments, the configuration information may comprise tags that identifying an address of a controller. The configuration information may be used to identify a communications protocol the controller uses. Once a controller is discovered, the available related information of the controller may be retrieved from the controller.

An exemplary methodology for target interrogation describe herein utilizes communication methods set up for programming and configuration of controllers by human technicians. A collection of protocol specific PLC introspection directives is assembled. Each of these directives drives an introspection engine to reach in to the controller to obtain the necessary information. The engine obtains the make/model of a controller, finding the appropriate introspection directives, executing the sequence of commands, and then processing the final output. In this example, the data or data source discovery mechanism discovers devices that are subtended to a controller by masquerading as a human technician in order to obtain the controller's internal configuration and programming.

Mechanism for Maintaining an Introspection Directives Storage

Another component of the platforms and systems described herein, and utilized by the methods described herein is introspection directives storage maintenance mechanism. See, e.g., FIG. 1 at 130, FIG. 2 at 211, and FIG. 3 at 330. The introspection directives storage maintenance mechanism maintains a plurality of introspection directives in a database. The database can be a stand-alone database (e.g., Introspection directives storage 130 of FIG. 1), or it can be a sub-storage of a storage module 170 of FIG. 1 or 370 of FIG. 3. The introspection directives may comprise a sequence of instructions specific to a communications protocol. In some embodiments, the sequence of instructions comprises instructions to send at least one command to a controller in accordance with the communications protocol, instructions to receive a response to the command, and instructions to parse the response. For example, a discovered controller may be a controller uses Hypertext Transfer Protocol (HTTP). In this case, the directive that is specific to this HTTP protocol may comprise specific Uniform Resource Locators (URLs) to which to send one or more GET/POST requests. Alternatively or additionally, the directive specific to this HTTP protocol may also comprise content to scrape from the response to the command or one or more files to download. In some other embodiments, the communications protocol may comprise Telnet, Secure Shell (SSH), or serial console port communications. The introspection directives storage maintenance mechanism herein maintains the plurality of introspection directives that generally have sequences of instructions for sending a command, receiving a response to the command, and parsing the response. The command may comprise one or more text based or binary commands. These introspection directives may be stored in a database for later deployment by other components or mechanisms. The plurality of directives serves a goal to obtain a response that contains field mappings, source code, complied code, or a full system backup for the controllers. This response may then be further processed to discover the subtended devices and how these subtended devices are mapped in the controller and the associated automation environment. The storage for storing the directives may comprise local or remote database, a flat filesystem, a memory, or a combination thereof.

Mechanism for Identifying Directive

Another component of the platforms and systems described herein, and utilized by the methods described herein is introspection directive identification mechanism. See, e.g., FIG. 1 at 140 and FIG. 3 at 340. The introspection directive identification mechanism may identify an appropriate directive for the discovered controller. In some embodiments, the introspection directive identification mechanism queries the introspection directives storage maintenance mechanism (e.g., the data store for storing the introspection directive) based on the protocol the discovered controller uses. In some embodiments, the introspection directive identification mechanism may obtain the make/model of the discovered controller, and then identify an appropriate introspection directive for the controller. In some embodiments, introspection directive identification mechanism may retrieve configuration information from the discovered controller and use the configuration information to identify an appropriate introspection directive for the controller. In some embodiments, the introspection directive identification mechanism may utilize passive discovery, active discovery, target interrogation, or a combination thereof. Because the introspection directives are communications protocol specific, the introspection directive identification mechanism may need to retrieve the communications protocol before identifying an introspection directive. In some embodiment, there may not be a suitable introspection directive for the discovered controller (such as in a situation where a new make/model of controller is discovered), the platform or systems of the present disclosure may push a task to another component or a technician.

Mechanism for Communicating Identified Directive

Another component of the platforms and systems described herein, and utilized by the methods described herein is directive communication mechanism. See, e.g., FIG. 1 at 150, FIG. 3 at 350. The directive communication mechanism may sit between the directive identification mechanism and a controller or an introspection module. The directive communication mechanism may communicate with a controller by sending an identified directive to the controller. In some embodiments, the directive communication mechanism may be a sub-component of the directive identification module, or a sub-component of an introspection module. The directive communication mechanism may operate in accordance with the protocol the controller uses to communicate with the controller. In some embodiments, the directive communication mechanism may be able to operate in accordance with multiple protocols. In some other embodiments, the directive communication mechanism may be able to operate in accordance with all the protocols identified in the automation environment. In yet further embodiments, the controller may utilize more than one communications protocols, for example, a first communications protocol for control, sensing, or eventing; and a second communications protocols for programming or configuration. In this case, the directive communication mechanism may be able to operate in accordance with one of these protocols to communication with the controller, depending on what function it is operating upon.

Mechanism for Introspection

Another component of the platforms and systems described herein, and utilized by the methods described herein is introspection mechanism. See, e.g., FIG. 1 at 160, FIG. 3 at 360. The introspection mechanism may execute the sequence of instructions comprised by an identified directive with respect to the discovered controller. In some embodiments, the introspection mechanism may send one command to the controller, receive a response to the command, and parse the response to discover one or more subtended devices to the controller and how these devices mapped in the controller. In some embodiments, the command is sent to the controller and the response is received from the controller over a wired network, a wireless network, or a combination thereof. In various embodiments, the network comprises ethernet, IP, serial buses, and other forms of communication between two or more IoT devices. In some embodiments, the introspection mechanism may identify an appropriate introspection directive for a discovered controller without the aid of the directive identification mechanism. In this case, the introspection mechanism may retrieve the make/model of the discovered controller and then identify an appropriate introspection directive for the controller.

Mechanism for Retrieving Authentication Credentials

Another component of the platforms and systems described herein, and utilized by the methods described herein is authentication credentials retrieve mechanism. Some of the controllers may require authentication to access the configuration portions of the controller. When authentication is encountered, the authentication credential retrieve mechanism may fetch the authentication. The authentication credential retrieve mechanism may query a manually configured list of possible credentials, a manually configured list of target credentials. In some embodiments, the authentication credential retrieve mechanism may fetch credentials from a database. In some other embodiments, the authentication credential retrieve mechanism may prompt a technician to retrieve the credentials. This authentication credential retrieve mechanism is an optional component, and it may operate when there is a need for authentication credentials.

Mechanism for Storing the Result from the Introspection

Another component of the platforms and systems described herein, and utilized by the method described herein is introspection result storage mechanism. See, e.g., FIG. 1 at 170, FIG. 3 at 370. The introspection result storage mechanism may be a simply relational database. In another example, a combination of relational database and a time-series database may be used by introspection result storage mechanism. A time-series database may reflect the introspection result overtime. Generally, a relational database enjoys the benefit of robust secondary index support, complex predicates, a rich query language, etc. However, when the data changes rapidly overtime, the volume of data can scale up enormously. Thus, it is preferable to have a separate time-series database works alongside the relational database to better store any changes of the incoming data. In some embodiments, the introspection result may reflect a number of subtended devices in a controller. For example, a Controller A may control ten (10) different IoT devices. Each of these IoT devices may have data reflecting events or state changes over time. These events or state changes may be used to analyze how these IoT devices mapped in this Controller A. In this case, an events or state changes storage component may utilize a graph database to store the mapped data. A graph database is a database that uses graph structure for semantic queries with nodes (please note that "node" and "vertex" are used interchangeably in this application), edges, and properties to represent and store data. The data storage component (e.g., events or state changes storage mechanism) of the present subject matter provides a data structure wherein each vertex (node) in the graph also has a time-series store to capture state changes overtime. The time-series store may be a standalone database, or it can be defined as a property of the vertex (node). For example, the temperature data extracted from temperature sensor O at 8 PM on Jan. 27, 2021 may be stored in a graph database. The node in the graph may represent sensor O (which is a data source according to the present subject matter) and the value is 27° C. The timestamp 8 PM on Jan. 27, 2021 is stored as property for this node in the graph of the graph database. The time-series store may be associated with the nodes, and it may reflect the state changes overtime and provide a user with actionable insight. Subsequently, for example, the temperature data extracted from the same temperature sensor O at a later time, such as at 11 PM on Jan. 27, 2021 may be stored in the graph database. The same node in the graph still represents sensor O and the value is changed to 20° C. The timestamp 11 PM on Jan. 27, 2021 is stored as property for this node in the graph of the graph database. This constitute an event or state change associated with sensor O. By analyzing these events or state changes, the platforms or systems described herein may generate a sub-graph for this Controller A, reflecting the subtended IoT devices, and how these subtended IoT devices mapped in this controller.

Computing System

Figure 5:
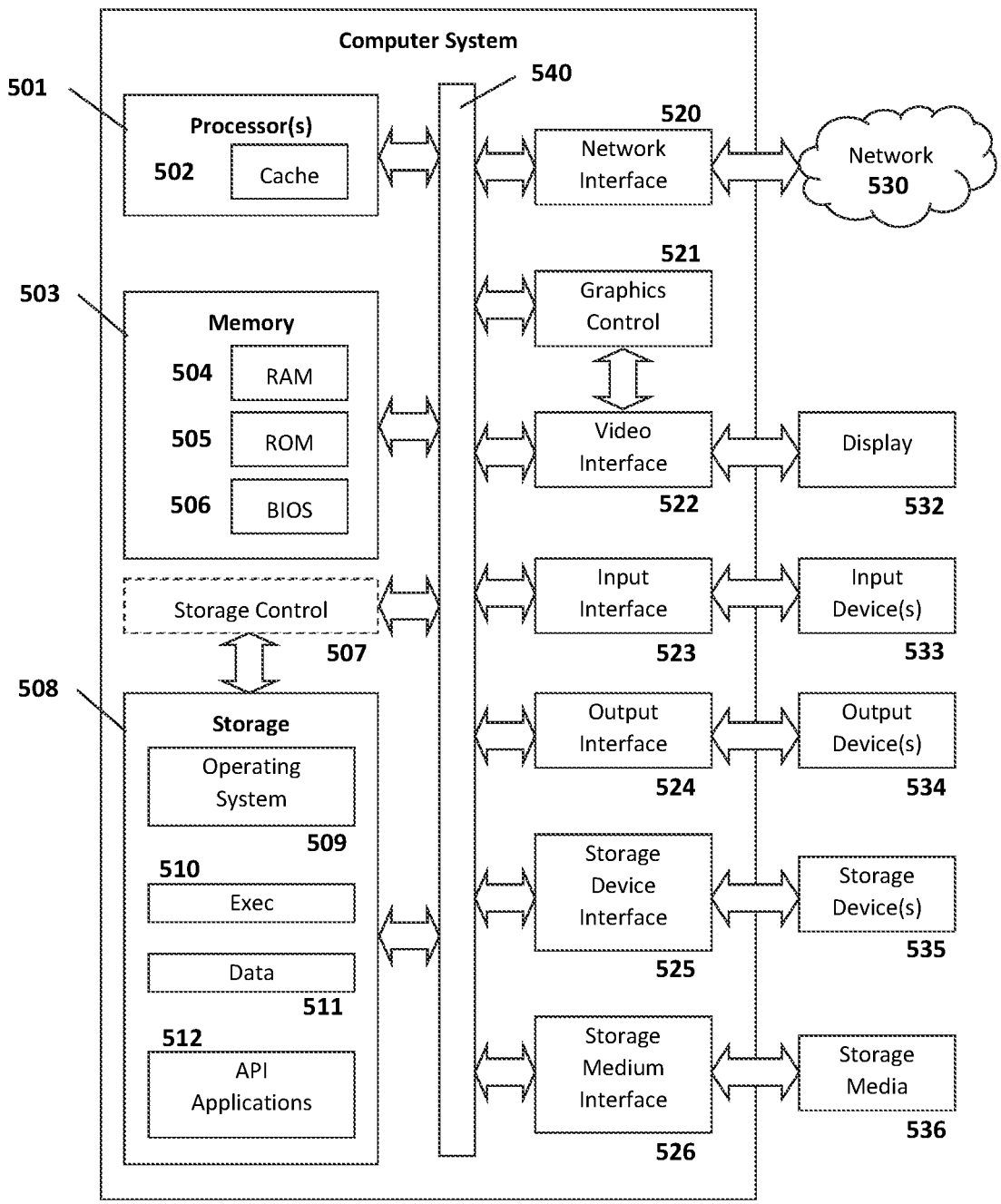
FIG. 5 shows a non-limiting example of a computing device; in this case, a device with one or more processors, memory, storage, and a network interface.

Referring to FIG. 5, a block diagram is shown depicting an exemplary machine that includes a computer system 500 (e.g., a processing or computing system) within which a set of instructions can execute for causing a device to perform or execute any one or more of the aspects and/or methodologies for static code scheduling of the present disclosure. The components in FIG. 5 are examples only and do not limit the scope of use or functionality of any hardware, software, embedded logic component, or a combination of two or more such components implementing particular embodiments.

Computer system 500 may include one or more processors 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 500 includes one or more processor(s) 501 (e.g., central processing units (CPUs), general purpose graphics processing units (GPGPUs), or quantum processing units (QPUs)) that carry out functions. Processor(s) 501 optionally contains a cache memory unit 502 for temporary local storage of instructions, data, or computer addresses. Processor(s) 501 are configured to assist in execution of computer readable instructions. Computer system 500 may provide functionality for the components depicted in FIG. 5 as a result of the processor(s) 501 executing non-transitory, processor-executable instructions embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein.

Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., static RAM (SRAM), dynamic RAM (DRAM), ferroelectric random access memory (FRAM), phase-change random access memory (PRAM), etc.), a read-only memory component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, executable(s) 510, data 511, applications 512 (application programs), and the like. Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide non-volatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, distributed computing systems, cloud storage systems, cloud computing systems, and the like, connected to network 530. The network 530 may comprise ethernet, IP, serial buses, and other forms of communication between two or more IoT devices. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 530, may employ a wired and/or a wireless mode of communication. In general, any network topology may be used.

Information and data can be displayed through a display 532. Examples of a display 532 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 532, computer system 500 may include one or more other peripheral output devices 534 including, but not limited to, an audio speaker, a printer, a storage device, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, automation environment information, data source information, introspection directive information, commands information, algorithm information, relationship information, and subtending information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, MongoDB, and the like. Suitable graph databases include, by way of non-limiting examples, ArangoDB, AnzoGraph DB, JanusGraph, Neo4j, Sparksee, Sqrrl Enterprise, and the like. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the software applications, systems, and methods described herein and are not meant to be limiting in any way.

Example—Use Case

In one of use cases, Company A buys a Factory B, or Company A is looking to integrate data of an existing facility Factory B with another set of data (e.g., data from a Warehouse C owned by Company A) to provide better visibility of the operation of Factory B and/or Warehouse C. In many instances, Factory B may include a number of pieces of equipment that are connected to the internet that feature an IP address, i.e., IoT devices. However, if the accumulated data associated with the IoT devices is generated across a long period of time according to different standards by different service providers, it is quite possible that the data is not in a format that is readily understandable by Company A, and thus cannot provide actionable insight for Company A. For example, the data format may be in a proprietary format that is not useful for people in Company A to understand the operation of Factory B. Often times, a number of controllers may be implemented in a factory or warehouse to automatically control pieces of equipment. These controller may monitor inputs and outputs, and make logic-based decisions for automated processes or machines for the connected equipment or devices. In some cases, it is not immediately clear what equipment or devices a controller controls, and in what manner. When a factory or a facility was built years ago, the documentation regarding the controllers may be lost or intentionally disguised by the vendors. There is need to understand the connectivity and/or functionalities of each controller in a facility. Although a technician may manually trace down the hardware connection between the controllers and the devices and guess the correlations between them, it is time and labor consuming, especially considering the number of controllers and devices may be used in a big factory. Provided herein is the platforms and systems that may automatically introspect controllers, discover the subtended equipment or devices, and provide mapped data to the data owner (e.g., Company A), which will be described in more details below.

Factory B may be an example of an automated environment (e.g., IoT-connected ecosystem). The automated environment of Factory B may comprise electronically controllable equipment and controllers. The controllers may replace the relays, timers, or counters that were needed in the setting of controlling equipment in a factory. For example, an automobile manufacturing Factory B has assembly line with sensors, actuators, and effectors, lighting systems, HVAC systems with temperature sensors, etc. The Factory B may also have Controller H, which controls the lighting systems on the north side of the facility; and Controller I, which controls the lighting systems on the south side of the facility. It will be obvious to those skilled in the art that such controllers, electronically controllable equipment and/or devices are provided by way of example only. Each of these pieces of electronically controllable equipment and/or devices may be internet-connected and thus provide data for the operator of Factory B and the management team of Company A. The controllers used in the automobile manufacturing Factory B may manage the production line. For example, each controller may manage a small system (e.g., production line logistics). In some other examples, a controller may manage an assembly line, wherein the controller controls the transmission lines. It will be obvious to those skilled in the art that such controllers are provided by way of example only. Company A may also own other automobile manufacturing Factories H, I, and J, and a Warehouse C which stores parts for installation, such as brake components for cars. In many cases, each of the facilities B, H, I, J and C has tens of thousands of devices producing data, and they spread across millions of square feet, and use a multitude of protocols. Due to the lack of interoperability between the variety of controllers and IoT devices, in terms of both hardware variations and differences in the software running on them, it is hard to understand what subtended devices are controlled by a certain controller, and how the data from these devices mapped in this controller. Similarly, it is also hard to develop applications that work across the entire enterprise (i.e., Company A in this example). The following operations explain the solutions provided by the present subject matter to the above-mentioned problems.

The method provided by the present subject matter identifies/discovers a plurality of controllers and data sources associated with an automation environment. For example, a number of IoT devices are identified as data sources because they are capable of generating data associated with their operation respectively. The assembly line sensors, lighting system sensors, temperature sensors, etc. of Factory B may be identified as data sources in this case. A number of controllers are discovered or identified because they are capable of managing or controlling other devices or equipment associated with the automation environment. The data source identification process may involve passive discovery, active discovery, and/or target interrogation. A variety of other IoT devices of Factories H, I, and J, and a Warehouse C are identified as data sources via the same data source identification process.

After the data source/controller discovery and/or data source identification mechanism produces a list of potential data sources and controllers, a data extraction component may retrieve data from these potential data sources and controllers. For example, the data extraction component may retrieve configuration information of a discovered controller. The configuration information may contain tags that identifying an address of a controller. The configuration information may also be used to identify a communications protocol the controller uses. While some documentation of the controllers is readily not available due to legacy systems setup, there may be some available documentation that are embedded in upload/download application file of the controllers. The data extraction component may extract these files and analyze what subtended devices the controller manages. In most cases, one of the primary goals of extracting data from the controller is to determine what communications protocol the discovered controller uses. In the setting of extracting data from IoT devices, the data extraction component may retrieve, for example, temperature data from the temperature sensors. The temperature data may be associated with a timestamp indicating the temperature at a particular time of a day/week/month/year. The temperature data may also be associated with a location identifier indicating the temperature at a particular location of the facility. In another example, the data extraction component may retrieve installation speed data from the assembly line sensors. The installation speed data may indicate the speed that parts (e.g., car engines, brake components, wheels, etc.) are fed into the assembly lines. In some other cases, the installation speed data may indicate the speed that an installation is finished by the assembly line. The data extraction component may retrieve lighting data from the lighting system. The lighting data may be associated with a timestamp indicating whether the light is on at a particular time of a day/week/month/year and potentially the luminance. The lighting data may also be associated with a location identifier indicating where the lighting data is collected. In some other examples, the data extraction component may retrieve inventory data from an inventory sensor in the Warehouse C. The inventory data may indicate the amount of parts (e.g., engines, brake components, wheels, etc.) that are in stock in the Warehouse C. Additionally, the data extraction component may retrieve transportation data from a fleet of trucks that transport parts between Warehouse C and Factories B, H, I, and J. The transportation data may indicate the transportation capacity of the fleet of trucks, idling durations of the trucks, and the time durations required for delivery across different time of a day (i.e., rush hours vs. non-rush hours), different time of a week (i.e., weekdays vs. weekend), different time of a year (i.e., winter time with closed highways vs. summer time with no potential closures).

Separately, the platforms and systems of the present disclosure may maintain a data store that stores a plurality of introspection directives. This data store can be a stand-alone database, or it can be a sub-storage of a storage module. The storage for storing the directives may comprise local or remote database, a flat filesystem, a memory, or a combination thereof. The introspection directives may comprise a sequence of instructions specific to a communications protocol. In some embodiments, the sequence of instructions comprises instructions to send at least one command to a controller in accordance with the communications protocol, instructions to receive a response to the command, and instructions to parse the response. For example, a discovered controller may be a controller uses Hypertext Transfer Protocol (HTTP). In this case, the directive that is specific to this HTTP protocol may comprise specific Uniform Resource Locators (URLs) to which to send one or more GET/POST requests. Alternatively or additionally, the directive specific to this HTTP protocol may also comprise content to scrape from the response to the command or one or more files to download. In some other embodiments, the communications protocol may comprise Telnet, Secure Shell (SSH), or serial console port communications. The introspection directives storage maintenance mechanism herein maintains the plurality of introspection directives that generally have sequences of instructions for sending a command, receiving a response to the command, and parsing the response. The command may comprise one or more text based or binary commands. These introspection directives may be stored in a database for later deployment by other components or mechanisms. The plurality of directives serves a goal to obtain a response that contains field mappings, source code, complied code, or a full system backup for the controllers. This response may then be further processed to discover the subtended devices and how these subtended devices are mapped in the controller and the associated automation environment.

Once the data is extracted, and the communications protocol of a controller is determined, the introspection directive identification mechanism may identify an appropriate directive for this controller. The introspection directive identification component may query the introspection directive data store based on the communications protocol of the controller. Alternatively or additionally, the introspection directive identification module may obtain the make/model of the discovered controller, and then identify an appropriate introspection directive for the controller. In some cases, the introspection directive identification module may retrieve configuration information from the discovered controller and use the configuration information to identify an appropriate introspection directive for the controller. The introspection directives are communications protocol specific, and thus the communications protocol of a controller is needed to identify the appropriate communications protocol. For example, if a discovered controller uses Hypertext Transfer Protocol (HTTP), then the directive that is specific to this HTTP protocol will be identified for this controller, and the identified directive may comprise specific Uniform Resource Locators (URLs) to which to send one or more GET/POST requests. In some embodiments, the introspection directive identification mechanism may utilize passive discovery, active discovery, target interrogation, or a combination thereof. In some embodiment, there may not be a suitable introspection directive for the discovered controller (such as in a situation where a new make/model of controller is discovered), the platform or systems of the present disclosure may push a task to another component or a technician.

The identified directive is then communicated to the controller by a communication module. The communication module may sit between the directive identified component and a controller. Alternatively, the communication module may sit between the directive identified component and an introspection module. The directive communication module may communicate with a controller by sending an identified directive to the controller. The directive communication module may be a sub-component of the directive identification component, or a sub-component of an introspection module. The communication module may operate in accordance with the communications protocol of the controller to communication with the controller. The directive communication mechanism may operate in accordance with the protocol the controller uses to communicate with the controller. In some embodiments, the directive communication mechanism may be able to operate in accordance with multiple protocols. In some other embodiments, the directive communication mechanism may be able to operate in accordance with all the protocols identified in the automation environment. In yet further embodiments, the controller may utilize more than one communications protocols, for example, a first communications protocol for control, sensing, or eventing; and a second communications protocols for programming or configuration. In this case, the directive communication mechanism may be able to operate in accordance with one of these protocols to communication with the controller, depending on what function it is operating upon.

When an appropriate introspection directive is identified for a discovered controller, an introspection module may execute the directive with respect to the controller. As describe elsewhere herein, the introspection directive may include a sequence of instructions that may be executed with respect to the discovered controller. The introspection module may send one command to the controller, and then receive a response to the command. The introspection module may then parse the response to discover one or more subtended devices to the controller and how these devices mapped in the controller. The goal of the directives is to obtain a response that contains field mappings, source code, complied code, or a full system backup for the controllers. This response may be processed (e.g., parsed) by the introspection module to discover the subtended devices and how these subtended devices are mapped in the controller and the associated automation environment.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method comprising:
   a) maintaining, at a data store, a plurality of introspection directives, each introspection directive comprising a sequence of instructions specific to a communications protocol, the sequence of instructions comprising instructions to send at least one command to at least one controller associated with an automation environment in accordance with the communications protocol, instructions to receive a response to the at least one command, and instructions to parse the response;
   b) identifying an appropriate introspection directive for the at least one controller based on the communications protocol that the at least one controller is operating under, wherein the communications protocol comprises a control protocol, a supervisory protocol, an administrative protocol, an industrial protocol, or a combination thereof; and
   c) executing the sequence of instructions with respect to the at least one controller to perform operations comprising:
      i) in response to identifying one particular introspection directive, automatically sending at least one command to at least one controller, wherein the at least one command comprises a GET/POST request;
      ii) receiving a response to the at least one command from the at least one controller; and
      iii) parsing the response to discover one or more data sources subtended to the at least one controller and how they are mapped in the at least one controller.

2. The method of claim 1, further comprising accessing authentication credentials for the at least one controller required to access configuration information.

3. The method of claim 1, wherein the data store comprises a local or remote database, a flat filesystem, a memory, or a combination thereof.

4. The method of claim 1, wherein the automation environment comprises at least one networked industrial or commercial automation system.

5. The method of claim 1, wherein the at least one controller is centralized.

6. The method of claim 1, wherein the at least one controller is distributed.

7. The method of claim 1, wherein the at least one controller comprises a programmable logic controller (PLC).

8. The method of claim 1, wherein the identifying an appropriate introspection directive for the at least one controller comprises passive discovery, active discovery, target interrogation, or a combination thereof.

9. The method of claim 8, wherein the passive discovery comprises observing traffic on a network.

10. The method of claim 9, wherein the passive discovery comprises identifying an origin or a destination for the traffic on the network.

11. The method of claim 8, wherein the active discovery comprises accessing a configuration, IP subnet scanning on a network, port scanning on a network, protocol specific ID enumeration on a control bus, issuing protocol specific discovery commands on a network, or a combination thereof.

12. The method of claim 8, wherein the target interrogation comprises introspecting a parent device, peer device, or child device.

13. The method of claim 1, wherein the at least one command is sent to at least one controller and the response is received from the at least one controller over a wired network, a wireless network, or a combination thereof.

14. The method of claim 1, wherein the communications protocol comprises Hypertext Transfer Protocol (HTTP).

15. The method of claim 14, wherein the at least one command comprises one or more Uniform Resource Locators (URLs) to which to send one or more GET/POST requests.

16. The method of claim 14, wherein the instructions to parse the response comprise content to scrape from the response or one or more files to download.

17. The method of claim 1, wherein the communications protocol comprises Telnet, Secure Shell (SSH), or serial console port communications.

18. The method of claim 17, wherein the at least one command comprises one or more text based or binary commands.

19. The method of claim 17, wherein the instructions to parse the response comprise one or more expected responses.

20. The method of claim 1, further comprising identifying the make and model of the at least one controller.

21. The method of claim 1, wherein the at least one controller utilizes a first communications protocol for control, sensing, or eventing and a second communications protocol for programming or configuration.

22. The method of claim 1, wherein the at least one controller utilizes the same communications protocol for control, sensing, or eventing and for programming or configuration.

23. The method of claim 1, wherein the one or more data sources subtended to the at least one controller comprises at least one sensor, at least one actuator, at least one effector, at least one automation controller, at least one programmable logic controller (PLC), at least one data file, at least one cloud service, or a combination thereof.

24. The method of claim 1, wherein the response comprises field mappings, source code, compiled code, a full system backup for the at least one controller, or a combination thereof.

25. The method of claim 1, wherein one or more of the identifying an appropriate introspection directive and the executing the sequence of instructions are performed by a gateway in communication with the automation environment.

26. The method of claim 1, wherein one or more of the identifying an appropriate introspection directive and the executing the sequence of instructions are performed by a computing device in communication with the automation environment.

27. The method of claim 1, wherein the steps are performed by a computer-based platform automatically.

28. A system comprising at least one computing device comprising at least one processor, a memory, and instructions executable by the at least one processor to create an application comprising:
a) a data store comprising a plurality of introspection directives, each introspection directive comprising a sequence of instructions specific to a communications protocol, the sequence of instructions comprising instructions to automatically send at least one command, instructions to receive a response to the at least one command, and instructions to parse the response, wherein the at least one command comprises a GET/POST request;
b) a communication module configured to communicate with at least one controller associated with an automation environment in accordance with the communications protocol; and
c) an introspection module configured to identify an appropriate introspection directive for the at least one controller based on the communications protocol that the at least one controller is operating under, and to execute the sequence of instructions with respect to the at least one controller, in response to identifying the appropriate introspection directive, to discover data sources subtended to the at least one controller and how they are mapped in the at least one controller,
wherein the communications protocol comprises a control protocol, a supervisory protocol, an administrative protocol, an industrial protocol, or a combination thereof.

* * * * *